June 19, 1923.                                         1,459,212.
W. KATH
RATE OF FLOW INDICATOR FOR VENTURI METERS
Filed Aug. 24, 1921
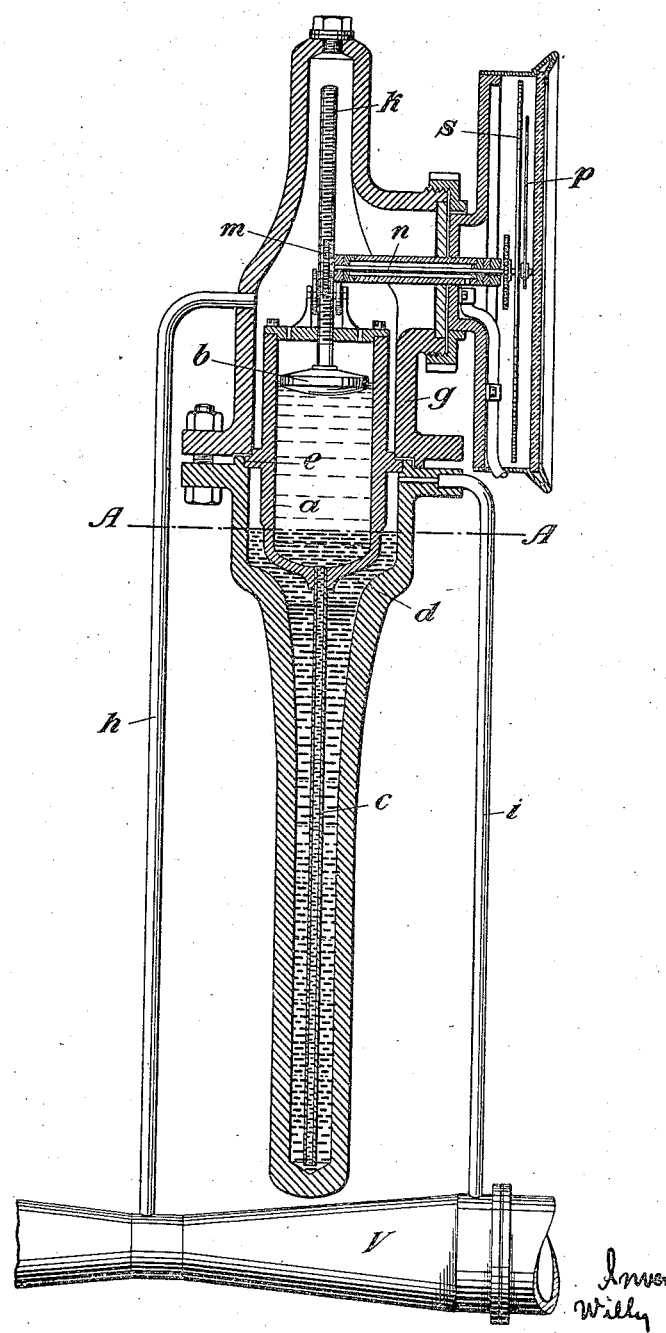
Inventor
Willy Kath
by Knight Bros
Attorneys Patented June 19, 1923.

1,459,212

UNITED STATES PATENT OFFICE.

WILLY KATH, OF BERLIN-FRIEDENAU, GERMANY, ASSIGNOR TO SIEMENS & HALSKE AKTIENGESELLSCHAFT, OF SIEMENSSTADT, NEAR BERLIN, GERMANY, A CORPORATION OF GERMANY.

RATE OF FLOW INDICATOR FOR VENTURI METERS.

Application filed August 24, 1921. Serial No. 494,986.

*To all whom it may concern:*

Be it known that I, WILLY KATH, a citizen of the German Empire, residing at Berlin-Friedenau, Germany, have invented certain new and useful Improvements in Rate of Flow Indicators for Venturi Meters (for which I have filed an application in Germany, April 17, 1915, Pat. No. 295341; Austria, April 4, 1916, Patent No. 76030; Czechoslovakia, April 28, 1920, Ser. No. 3208-20), of which the following is a specification.

My invention relates to rate of flow indicators for Venturi meters. Rate of flow indicators for Venturi meters in which one mercury containing vessel is made of special shape in order to obtain an alteration of the mercury level in the other vessel proportionate to the quantity of water or other fluid passing through the Venturi tube, have hitherto been provided with two separate vessels which are connected together by a small piece of tubing.

The disadvantage of this arrangement is that, on the one hand, the connecting tube owing to possible leakages may cause trouble because, if mercury is lost, the indicator will no longer indicate correctly and, on the other hand, owing to the two separate vessels, the apparatus becomes unwieldy and its installation is rendered complicated.

The object of the present invention is to arrange the two mercury vessels one inside the other. In order to overcome the difficulties attending such an arrangement, the one mercury vessel dipping into the other is made with a varying cross-sectional area in such a manner that the upper portion with the larger cross-sectional area serves as chamber for containing the float, whereas the lower portion, forming the dipping tube proper, is made of such small area as to be almost negligible. In consequence of this design of the dipping tube vessel the distance between the lower part of the tube and the internal wall of the lower or outer vessel,—which distance must be in a distinct ratio to the diameter of the float chamber,—may be made sufficiently large so as to preclude the danger of clogging. On the other hand, even a very small diameter of the dipping tube will not conduce to clogging and, thereby, to a failure of the apparatus to operate, as the dipping tube is always filled with mercury only and will never come in contact with water or another fluid.

Owing to the impossibility of shaping the outer vessel on a curve passing into infinity which would determine the shape of this vessel, no proportionate adjustment of the float can take place for a certain part of measurement. Therefore the larger part of the internal vessel, as measured from the zero-line, extends for such a distance into the external vessel which corresponds to the irregular part of the scale of the indicating device. For this comparatively short distance adjacent to the zero-line according to this present invention the two vessels are shaped in a manner deviating from the rule determining the shape of the other parts. Preferably they are constructed with cylindrical section, and up to the point at which the thin portion of the dipping tube commences, they are best made of such dimensions that the sectional area of the two mercury columns becomes equal so that the mercury level adjusts itself in proportion to the square of the quantity passing through the Venturi tube. In this manner a handy apparatus of moderate dimensions is obtained which can easily be made and which requires only a comparatively small quantity of mercury. This is taken into account by a corresponding division of the indicator scale. Commencing from the thin portion of the dipping tube, the external vessel is made of such sectional area as is computed for obtaining a proportionate adjustment plus the sectional area of the thin portion of the dipping tube.

The drawing, representing a sectional elevation, shows by way of example how the innovation may be carried into effect.

The cylindrical mercury vessel $a$ containing the float $b$ communicates by means of a small tube $c$ with the external vessel $d$ and is kept in position by means of a flange $e$ provided thereon and located between a flange on the external vessel and a dome-shaped top $g$ of this vessel. The top is sealed air-tight and is connected to the Venturi-tube V by a pipe $h$, the external vessel being connected to the Venturi tube by the pipe $i$. The float is provided with a rack $k$ in the known manner, which engages a pinion $m$ mounted on a spindle $n$. The spindle transmits the movement of the float to the indicator mechanism consisting essentially of a pointer $p$ moving over a scale $s$.

Commencing from the zero-line A—A, the mercury level in the vessel $a$ does not at first move upward in a simple ratio of the quantity passing through but in proportion to the square of this quantity until such a time when the mercury level in the vessel $d$ has fallen to a point where this vessel contains no more mercury except for the small portion $c$ of the dipping tube. For this disproportionate distance, which is very small compared with the total movement, the two vessels are made of cylindrical shape and dimensioned in such a way that the sectional area of the mercury columns is equal in both vessels.

Having now described my invention what I claim as new and desire to secure by Letters Patent is:—

Rate of flow indicator for Venturi meters comprising two mercury vessels arranged one inside the other, a float, supported by the mercury in the inner vessel, and an indicator mechanism connected to said float, the outer vessel being shaped nearly up to the zero-line in such a way that the mercury level in the inner vessel changes in proportion to the quantity of fluid passing through the Venturi tube, and the interior vessel having at its upper portion down to a point slightly beneath the zero-line a larger sectional area and consisting at its lower portion of a small tube extending substantially to the bottom of the outer vessel, both vessels being so dimensioned adjacent to the zero-line that about this line the two mercury columns are of equal or of approximately equal sectional area.

In testimony whereof I affix my signature.

WILLY KATH.